Feb. 25, 1958  L. A. GRIBLER ET AL  2,824,550
POWER STEERING VALVE WITH SINGLE REACTION CHAMBER
Filed Jan. 26, 1954  2 Sheets-Sheet 1
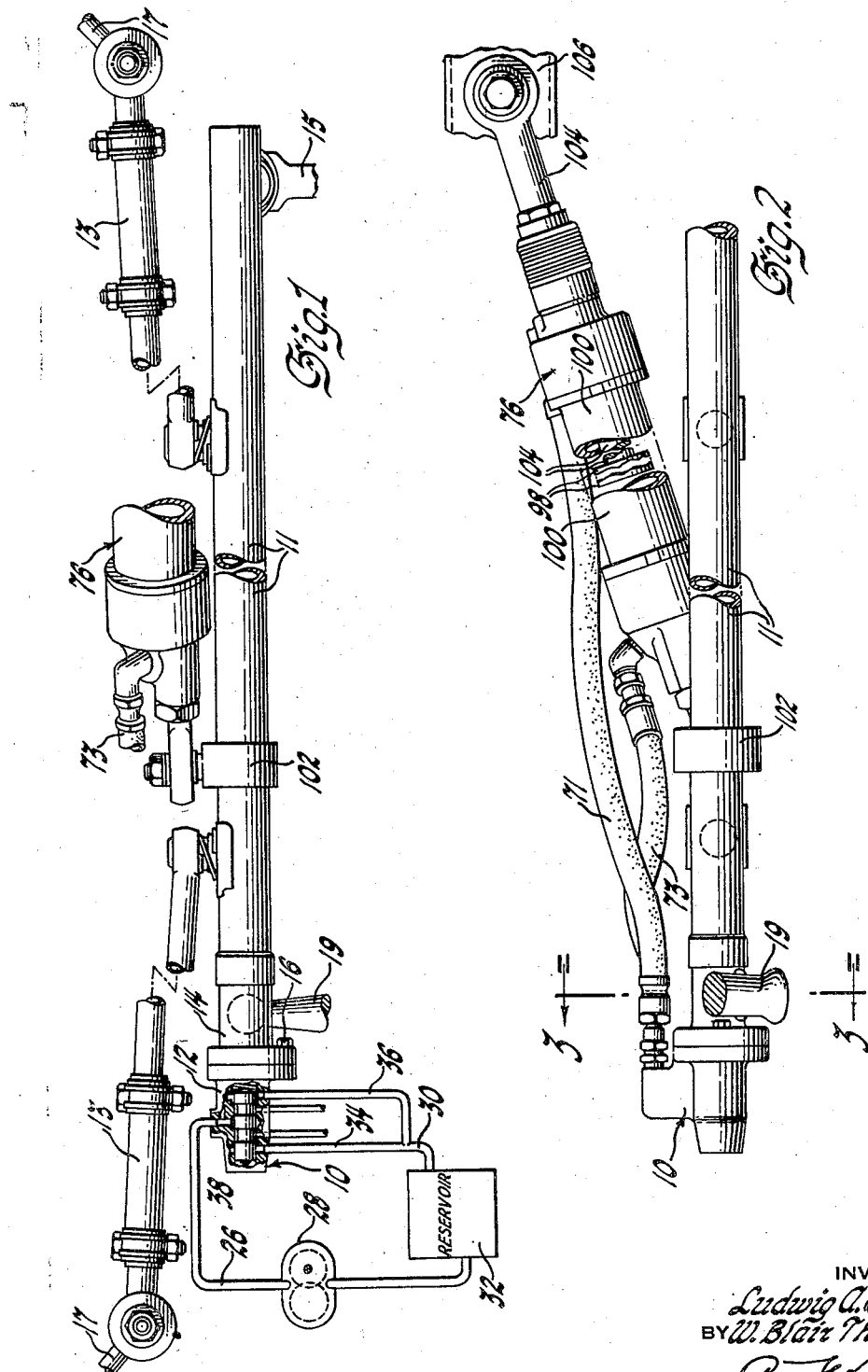
INVENTORS
Ludwig A. Gribler, Sr.
BY W. Blair Thompson
ATTORNEY Feb. 25, 1958 L. A. GRIBLER ET AL 2,824,550
POWER STEERING VALVE WITH SINGLE REACTION CHAMBER
Filed Jan. 26, 1954 2 Sheets-Sheet 2
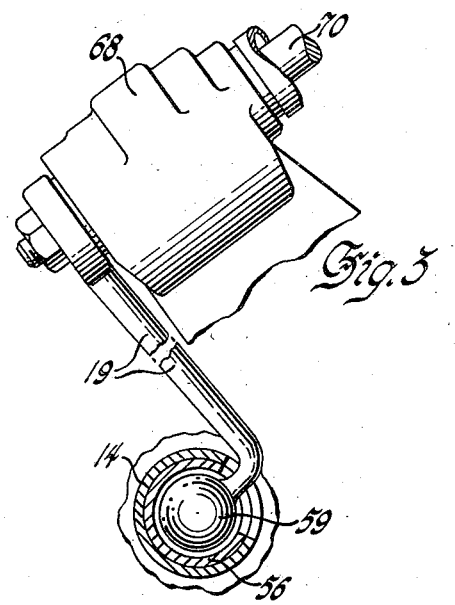
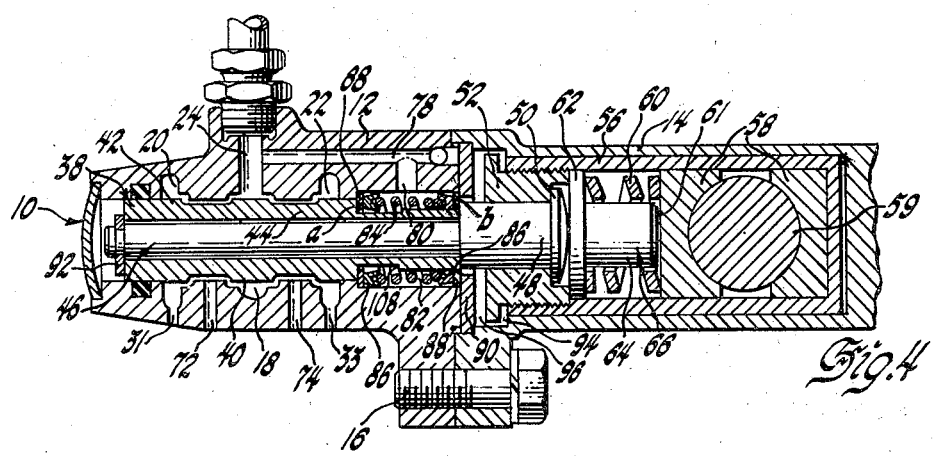
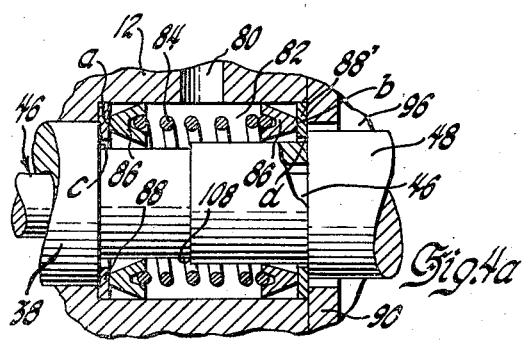
INVENTORS
Ludwig A. Gribler &
BY W. Blair Thompson
C. A. Dibble
ATTORNEY

United States Patent Office 2,824,550
Patented Feb. 25, 1958

2,824,550

POWER STEERING VALVE WITH SINGLE REACTION CHAMBER

Ludwig A. Gribler and William Blair Thompson, Saginaw, Mich., assignors to General Motors Corporation, Detroit, Mich., a corporation of Delaware Application January 26, 1954, Serial No. 406,118

5 Claims. (Cl. 121—46.5)

This invention relates to the power steering of automotive vehicles and more particularly concerns a fluid operated power steering gear having improved centering characteristics.

The more successful of the fluid power steering systems presently in use employ oil as the fluid medium and comprise an "open center" valve through which the oil is normally continuously circulated by an engine driven pump. In addition to being subject to the pump pressure at all times, this valve is normally open to both faces of a double-acting piston confined within a power cylinder and having a shaft or stem integral therewith or secured thereto extending from one end of the cylinder. Either the shaft or the cylinder may be operatively connected to a selected steering member. Assuming a predetermined steering resistance, one of the valve parts is caused to slide or rotate (depending on the nature of the valve) in one direction or the other, as governed by the direction of rotation of the steering wheel, to substantially or completely confine the flow of oil to only one end of the cylinder while retarding or preventing exhaustion of any oil from such end. This brings about the desired powering of the steering member which continues until release of the effort at the steering wheel, when the valve parts become automatically centered, i. e. restored to their normal relative positions.

As in the case of any such servo mechanism, the automatic centering of the valve parts results from a follow-up action, one of the parts being so associated with a steered part that the movement of the latter tends to cause movement of the valve part to its normal relative position which is reached simultaneously with cessation of the effort at the steering wheel.

In order to obtain a steering "feel," which would otherwise be lacking, a spring system providing a resistance required to be overcome incident to any relative movement of the valve components is normally built into the valve. Such resistance may, with advantage, be supplemented by a hydraulic force operating in opposition to displacement of the valve parts and bearing a direct relation to the steering resistance. The overall added resistance may amount, for example, to about three-four pounds effort at the steering wheel, in which case the steering on smooth roads at normal cruising speeds may be entirely manual, the power means coming into play only at lesser speeds and during parking operations, for instance. Apart from providing a steering feel, the spring system, especially if aided by hydraulic means as just indicated, serves to dampen out road shocks normally transmitted to the steering wheel and thus provides a safety factor.

In the gears to which the present invention most specifically relates, the valve is of the spool-type including a central land serving on longitudinal movement of the spool to limit the oil flow to one side or the other of the piston in the power cylinder, as determined by the direction of such movement, and a pair of end lands equidistant from the central land, which are functional with respect to two return ports to the pump, or to a reservoir from which the pump is supplied. These end lands have previously been formed to a larger diameter than the central land for the purpose of hydraulic reaction (see above)—aided by springs at either end of the valve spool. While such construction, described in detail in copending application Serial No. 273,067, filed February 23, 1952 (now abandoned), works well in practice, it presents certain manufacturing difficulties, due chiefly to the variance in the land diameters, and the associated parts must be made larger than is desirable from an economic standpoint.

As indicated, our invention has as its principal object to provide a valve functionally equal to the prior valve, but which can be fabricated without variation in the land diameters and to smaller overall dimensions.

Other objects and features of the invention will be apparent from the following specific description of a preferred embodiment thereof. The description will proceed with reference to the accompanying drawings wherein:

Figure 1 is a broken plan view of a steering system comprising a power steering gear including the improved valve, certain parts of the gear being represented diagrammatically;

Figure 2 shows in broken elevation certain of the parts appearing in Figure 1;

Figure 3 is a broken side elevation illustrating the relation between the parts shown in Figures 1 and 2 and the gear box of the vehicle;

Figure 4 is a longitudinal section through the improved valve; and

Figure 4a is an enlarged fragmentary sectional detail showing certain parts of the valve.

In the drawings, the numeral 10 generally denotes a valve assembly fitted into the left-hand end of a drag link 11 which, with the tie rods 13 connected to steering knuckle arms 17, forms a conventional parallelogram linkage. The drag link is actuated through a pitman arm 19 and is supported at its end opposite the valve assembly by an idler arm 15. It is to be understood that the invention is not limited to this particular type of linkage, which is selected for purposes of illustration only.

The valve 10 comprises a housing portion 12 shown as joined by bolting 16 to a housing 14 confining means through which the valve is actuated. Housing member 12 is internally bored and counterbored to provide annular channels 18, 20 and 22. An inlet passageway 24 representing an extension of the discharge line 26 of a pump 28 opens to the annular passageway 18. Channels 20 and 22 communicate with a return line 30 to a reservoir 32, from which the pump 28 draws, via passageways 31 and 33 and branch lines 34 and 36, respectively.

Confined within the housing 12 is a spool element 38 carrying a central land 40 functional with respect to the inlet passageway 24 and a pair of end lands 42 and 44 functional with respect to exhaust passageways 31 and 33.

Extending centrally through the spool 38 is a stem 46 having an enlarged portion 48, to the right of the spool, terminating in a flange 50. This flange is trapped in a recess formed in a plug member 52, threaded into a sleeve 56, axially movable in the housing 14. Such sleeve confines a pair of seats 58 for the ball 59 at the end of the pitman arm 19 and further confines a helical spring 60 which exerts its force against the inner ball seat and against the head 62 of an element 66 having a shank portion 64 surrounded by the spring. The head 62, as shown, abuts the end of the plug 52 and the rounded face of the flange 50, while the end of the shank 64 is slightly spaced from the inner ball seat 58, the resulting clearance 61 representing a desirable amount of lash or play.

Pitman arm 19 (Figure 3) depends from a gear box 68 which may contain any suitable mechanism for translating the rotary motion of the steering shaft 70 into a rocking motion, manifested through the pitman arm 19. Steering shaft 70 is to be understood as mounting the usual steering wheel, not shown.

Turning again to the valve 10, it will be seen (Fig. 4) that in addition to the passageways previously mentioned, the housing 12 includes "power" passageways 72 and 74, connecting via lines 71 and 73, respectively, (Fig. 2) with the opposite ends of a fluid motor 76, and a passageway 78 representing a branch of the inlet passageway 24. Passageway 78 leads to a short passageway 80 opening to a chamber 82 at the right-hand end of the spool 38.

A helical spring 84 within the chamber 82 tends to maintain the spool in its centered or neutral position as shown in Fig. 4. Such spring exerts its force through seals 86 and thrust washers 88, 88' at either end thereof. The left-hand washer 88 is shouldered into the housing 12, while the right-hand washer 88' abuts a ring piece 90 shouldered into the adjacent end of the housing 14.

With the relationship of the valve parts as described and illustrated, it should be apparent, ignoring the clearance at 61 and considering the retaining ring 92 snapped on the stem 46 at the left-hand end thereof, that the spool 38, and the sleeve 56, together with the parts therein confined, constitute one functional part, movable by the pitman arm 19 within the limits set by the clearances 94 and 96. The valve spool is not held rigidly between the retaining ring 92 and the shoulder against which the washer 86 bears, but is enabled to "float" within the limits of a few thousandths of an inch so as to eliminate any possibility of the spool binding in the valve housing.

The fluid motor 76, as shown, includes a double acting piston 98 working in a power cylinder 100, connected through a fixture 102 to the drag link 11. The shaft 104 of the piston 98 is anchored to the frame 106 of the vehicle, the cylinder thus constituting the moving part of the fluid motor.

It should be understood that with the valve spool in neutral position, the fluid medium, so long as the pump 28 is in operation, continuously circulates through the valve against the static pressure of the fluid in the two ends of the power cylinder.

Reverting to the chamber 82 at the right-hand end of the valve housing 12, it is to be particularly noted that this chamber is at all times connected to the pump inlet via the previously mentioned passageways 78 and 80. Accordingly, the fluid pressure in this chamber is at all times equal to the line pressure and when the spool 38 is shifted in either direction to energize the fluid motor, the pressure developing in the chamber is the same as that which develops in the pressurized end of the fluid motor, the latter pressure being set by the resistance to the turning of the dirigible wheels.

That portion of the valve spool 38 extending into the chamber 82 is formed to provide an annular step 108, best seen in Fig. 4a. This step operates to reduce the surface area available for hydraulic reaction incident to the rightward movement of the spool, which movement brings about pressurization of the right end of the cylinder 100, corresponding to a left turn. Thus, the area for hydraulic reaction in the case of a left turn is surface *a* (the inner surface of washer 88) plus the annular surface *c* minus the surface represented by the step 108. Conversely, the area for hydraulic reaction in the case of a right turn is the sum of the surfaces *b* and *d* and the step 108.

The reason for the differential areas just discussed goes to the fact that the piston rod 104 in the right-hand end of the cylinder 100 (Fig. 2) reduces the working surface of the corresponding face of the piston. In such circumstance, a higher pressure is required to energize the fluid motor in the case of a left turn than in the case of a right turn. This higher pressure is compensated for by the step 108, in the absence of which more effort would be required at the steering wheel to move the valve spool to the right than to the left.

To describe now the general operation of the disclosed gear, let it be assumed that the steering resistance obtaining exceeds the preloading of the centering spring 84 and that the steering shaft 70 is turned to the right to negotiate a right turn. This brings about a counterclockwise rocking of the pitman arm 19 (Fig. 1) and displacement of the spool 38 to the left. Accordingly, the fluid flow is partially or completely confined (depending upon the exact magnitude of the steering resistance) to the right side of the valve so that a pressure differential immediately develops in the power cylinder 100 in favor of the left-hand chamber of the cylinder. The cylinder is thus forced to the left to power the drag link 11 in that direction, corresponding to a rightward swinging of the dirigible wheels, not shown.

Should the steering shaft 70 be rotated counterclockwise to negotiate a left turn, the action obviously will be just the opposite of that above described, assuming again, that the steering resistance exceeds the preloading of the spring 84.

Irrespective of the direction of turn, it should be apparent that following the initial movement of the spool, the force tending to displace the same must overcome not only the resistance provided by the spring 84, but also that of the fluid pressure which develops in the chamber 82 housing the spring. This chamber being open at all times to the inlet passageway, such pressure is necessarily the same as the pressure required to move the piston in the cylinder, hence the fluid resistance to displacement of the spool is proportionate to the steering resistance—a highly desirable condition in that the operator of the vehicle is given a "steering feel" varying as the steering resistance.

The preloading of the spring 84 is arbitrary, representing, for example, from two to eight pounds of effort at the steering wheel. When the steering resistance is of a low value, the steering may be accomplished solely by manual effort through the valve assembly (displacement of the valve spool being prevented by force of the spring), the assembly, in such case, acting merely as an extension of the drag link 11. Should the power system for any reason fail, the vehicle can be readily steered manually, irrespective of the steering resistance, the effort required being only slightly greater than that demanded in the instance of conventional mechanical steering apparatus.

It will be understood that the valve housing constitutes the follow-up member of the booster unit, the same moving in a direction corresponding to the direction of movement of the valve spool and tending at all times to catch up with the spool, so to speak, thereby to bring the two parts into a centered relation so as to de-energize the fluid motor.

Should the steering resistance be abnormally high (as when one of the dirigible wheels is being turned against a high curb, for example) damage to any of the component parts of the system may be prevented by a suitably located relief valve. This is a conventional expedient well known in the art and the valve, for that reason, is not illustrated in the drawing.

Having thus described and illustrated our invention, what we claim is:

1. In a fluid power steering control valve assembly adapted for use with steering apparatus including a pitman arm or the like, said assembly comprising a housing having therein a plurality of passageways including an inlet passageway, an exhaust passageway and a power passageway, together with a pair of annular internal channels to which said inlet passageway and said exhaust passageway respectively open, and comprising, additionally, a spool element confined by said housing having a bore therein solely to accommodate a stem member through which it is actuated in an axial direction by said pitman arm or the like to control fluid flow in said passageways, said spool element having a first land functional with respect to said inlet passageway and a second land functional with respect to said exhaust passageway, the combination of means providing a chamber at the end of said spool nearest said pitman arm or the like, said chamber communicating at all times with said inlet passageway so that any axial movement of said spool in use of the valve is resisted by the pressure of the fluid in said chamber.

2. In a fluid power steering control valve assembly adapted for use with steering apparatus including a pitman arm or the like, said assembly comprising a housing having therein a plurality of passageways including an inlet passageway, an exhaust passageway, together with a pair of annular internal channels to which said inlet passageway and said exhaust passageway respectively open, and a power passageway, and comprising, additionally, a spool element confined by said housing having a bore therein solely to accommodate a stem member through which it is actuated in an axial direction by said pitman arm or the like to control fluid flow in said passageways, said spool carrying a land functional with respect to said inlet passageway and a separate land functional with respect to said exhaust passageway, the combination of means providing a chamber at the end of said spool nearest said pitman arm or the like, said chamber communicating at all times with said inlet passageway and having therein a pair of yieldable walls providing reaction surfaces whereby in use of the valve axial movement of said spool is resisted by the pressure of the fluid in said chamber.

3. In a fluid power steering control valve assembly adapted for use with steering apparatus including a pitman arm or the like, said assembly comprising a housing having therein a plurality of passageways including an inlet passageway, an exhaust passageway and a power passageway, together with a pair of annular internal channels to which said inlet passageway and said exhaust passageway respectively open, and comprising, additionally, a spool element confined by said housing having a bore therein solely to accommodate a stem member through which it is actuated in an axial direction by said pitman arms or the like to control fluid flow in said passageways, said spool carrying a land functional with respect to said inlet passageway and a separate land functional with respect to said exhaust passageway, these lands being of annular conformation and being of equal diameter, the combination of means providing a chamber at the end of said spool nearest said pitman arm or the like, said chamber communicating at all times with said inlet passageway and having therein a pair of yieldable walls providing reaction surfaces whereby in use of the valve axial movement of said spool is resisted by the pressure of the fluid in said chamber.

4. In a fluid power steering control valve assembly adapted for use with steering apparatus including a pitman arm or the like, said assembly comprising a housing having therein a plurality of passageways including an inlet passageway, a pair of exhaust passageways and a pair of power passageways, together with a pair of annular internal channels to which said inlet passageway and said exhaust passageway respectively open, and comprising, additionally, a spool element confined by said housing having a bore therein solely to accommodate a stem member through which it is actuated in an axial direction by said pitman arm or the like to control fluid flow in said passageways, said spool carrying separate lands functional with respect to said inlet passageway and said exhaust passageways, these lands being of equal diameter, the combination of means providing a chamber at the end of said spool nearest said pitman arm or the like, said chamber communicating at all times with said inlet passageway so that any axial movement of said spool in use of the valve is resisted by the pressure of the fluid in said chamber.

5. A fluid power steering control valve assembly conforming to claim 4 further characterized in that there is confined in said chamber spring means operating to resist axial movement of said spool.

References Cited in the file of this patent

UNITED STATES PATENTS

| | | |
|---|---|---|
| 2,213,271 | Davis | Sept. 3, 1940 |
| 2,487,618 | Twyman | Nov. 8, 1949 |
| 2,608,263 | Garrison | Aug. 26, 1952 |
| 2,679,234 | Robinson | May 25, 1954 |
| 2,679,235 | Van Meter | May 25, 1954 |

U. S. DEPARTMENT OF COMMERCE

PATENT OFFICE

CERTIFICATE OF CORRECTION

Patent No. 2,824,550                                    February 25, 1958

Ludwig A. Gribler et al.

It is hereby certified that error appears in the printed specification of the above numbered patent requiring correction and that the said Letters Patent should read as corrected below.

Column 5, line 16, after "passageway," second occurrence, insert -- and a power passageway, --; line 19, strike out -- and a power passageway, --.

Signed and sealed this 22nd day of April 1958.

(SEAL)

Attest:

KARL H. AXLINE
Attesting Officer

ROBERT C. WATSON
Commissioner of Patents